United States Patent
Alnajjar et al.

(10) Patent No.: US 11,411,510 B2
(45) Date of Patent: Aug. 9, 2022

(54) DC/AC INVERTER RESONANCE TOPOLOGY

(71) Applicant: LEAR CORPORATION, Southfield, MI (US)

(72) Inventors: Seba Alnajjar, Southfield, MI (US); Tayler Jouja, Southfield, MI (US); Theodore Atanassov, Southfield, MI (US); David A. Hein, Sterling Heights, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 16/751,775

(22) Filed: Jan. 24, 2020

(65) Prior Publication Data

US 2021/0234473 A1    Jul. 29, 2021

(51) Int. Cl.
*H02M 7/48* (2007.01)
*H02M 3/335* (2006.01)
*H02M 3/337* (2006.01)
*H02M 1/00* (2006.01)

(52) U.S. Cl.
CPC ......... *H02M 7/4807* (2013.01); *H02M 3/337* (2013.01); *H02M 3/3376* (2013.01); *H02M 3/33569* (2013.01); *H02M 7/48* (2013.01); *H02M 1/0058* (2021.05); *H02M 1/0083* (2021.05); *H02M 7/4815* (2021.05)

(58) Field of Classification Search
CPC ............. H02M 7/4807; H02M 3/3376; H02M 2001/0083; H02M 2007/4815; H02M 7/48; H02M 1/0083; H02M 7/4815; H02M 3/33573; H02M 1/0058; H02M 1/007; H02M 3/01; H02M 3/337; H02M 7/44; Y02B 70/10
See application file for complete search history.

(56) References Cited

U.S. PATENT DOCUMENTS

| | | | | |
|---|---|---|---|---|
| 4,222,098 A | * | 9/1980 | Frosch ................... | H02H 7/122 363/56.07 |
| 4,780,659 A | * | 10/1988 | Bansal .................... | H02P 25/22 322/58 |
| 5,442,540 A | * | 8/1995 | Hua ....................... | H02M 3/158 363/98 |
| 5,625,539 A | * | 4/1997 | Nakata ................ | H02M 7/4807 363/132 |

(Continued)

*Primary Examiner* — Yusef A Ahmed
(74) *Attorney, Agent, or Firm* — Brooks Kushman P.C.

(57) ABSTRACT

A direct current/alternating current (DC/AC) inverter system includes a primary DC-DC converter that receives an input DC voltage and a secondary DC/AC inverter. The primary DC-DC converter includes a plurality of switching networks and a plurality of transformers having a plurality of primary windings and a plurality of secondary windings. Characteristically, the plurality of secondary windings is arranged in series to provide a first output and a second output. A resonant LC circuit is connected in series with the first output and the second output. A rectifier rectifies an AC voltage between the first output and the second output to form a first rectified output. The secondary DC/AC inverter receives the first rectified output or filtered output thereof and provides a high voltage AC output. A controller mediates switching of the plurality of switching networks.

16 Claims, 4 Drawing Sheets

(56) References Cited

U.S. PATENT DOCUMENTS

| | | | | |
|---|---|---|---|---|
| 5,768,112 | A * | 6/1998 | Barrett | H02M 1/44 363/16 |
| 5,805,434 | A * | 9/1998 | Vinciarelli | H02M 3/33507 363/16 |
| 5,852,555 | A * | 12/1998 | Martin | H02M 3/285 363/71 |
| 6,181,576 | B1 * | 1/2001 | Ikeda | B23K 9/1043 363/17 |
| 6,205,035 | B1 | 3/2001 | Vollmer et al. | |
| 6,275,391 | B1 * | 8/2001 | Laskai | H02M 3/3372 363/24 |
| 6,288,916 | B1 * | 9/2001 | Liu | H02J 3/38 363/37 |
| 6,754,090 | B2 * | 6/2004 | Arai | H02M 3/28 363/17 |
| 7,239,530 | B1 * | 7/2007 | Djekic | H02M 3/33592 363/16 |
| 9,071,150 | B2 * | 6/2015 | Zhang | H02M 3/3376 |
| 9,520,792 | B2 * | 12/2016 | He | H02M 3/335 |
| 9,537,401 | B2 | 1/2017 | Hembach et al. | |
| 9,667,157 | B1 * | 5/2017 | Dong | H03K 17/166 |
| 9,812,985 | B2 * | 11/2017 | Rodriguez | H02M 5/458 |
| 10,023,072 | B2 | 7/2018 | Ogale | |
| 10,804,809 | B1 * | 10/2020 | Yelaverthi | H02M 3/33561 |
| 2004/0027842 | A1 * | 2/2004 | Tanabe | H02M 3/3372 363/133 |
| 2005/0099827 | A1 * | 5/2005 | Sase | H02M 3/33569 363/16 |
| 2006/0092677 | A1 * | 5/2006 | Moussaoui | H02M 7/4826 363/71 |
| 2007/0070655 | A1 * | 3/2007 | Eguchi | H02M 7/5387 363/17 |
| 2009/0290389 | A1 * | 11/2009 | Ueno | H02M 3/337 363/21.02 |
| 2011/0051468 | A1 * | 3/2011 | Kyono | H02M 3/285 363/21.02 |
| 2012/0181950 | A1 * | 7/2012 | Yu | H05B 45/327 315/294 |
| 2012/0262967 | A1 * | 10/2012 | Cuk | H02M 7/4807 363/131 |
| 2012/0268969 | A1 * | 10/2012 | Cuk | H02M 3/005 363/17 |
| 2013/0242616 | A1 * | 9/2013 | Oldenkamp | H02M 7/4807 363/16 |
| 2013/0343093 | A1 * | 12/2013 | Ando | H02M 3/33584 363/17 |
| 2014/0153289 | A1 * | 6/2014 | Kao | H02M 3/3376 363/17 |
| 2014/0225439 | A1 * | 8/2014 | Mao | H02J 7/0029 307/31 |
| 2015/0023063 | A1 * | 1/2015 | Perreault | H02M 3/335 363/17 |
| 2015/0054337 | A1 * | 2/2015 | Ogale | H02M 3/33569 307/10.1 |
| 2015/0091463 | A1 * | 4/2015 | Jin | H05B 45/315 315/201 |
| 2015/0103564 | A1 * | 4/2015 | Duan | H02M 3/285 363/21.02 |
| 2015/0194909 | A1 * | 7/2015 | Pahlevaninezhad | H02M 7/5387 363/132 |
| 2016/0020016 | A1 * | 1/2016 | Ouyang | H02M 7/06 307/31 |
| 2016/0211841 | A1 * | 7/2016 | Harrison | H02M 3/07 |
| 2016/0336865 | A1 * | 11/2016 | Imai | H02M 3/33546 |
| 2016/0352229 | A1 * | 12/2016 | Norimatsu | H02J 3/385 |
| 2016/0352234 | A1 * | 12/2016 | Imai | H02M 3/337 |
| 2017/0013688 | A1 * | 1/2017 | Hsia | F21K 9/27 |
| 2017/0085189 | A1 * | 3/2017 | Madsen | H02M 3/338 |
| 2018/0287504 | A1 * | 10/2018 | Parsekar | H02M 3/335 |
| 2018/0367051 | A1 * | 12/2018 | Agamy | H02M 3/3376 |
| 2018/0369864 | A1 * | 12/2018 | Lei | G01N 29/225 |
| 2020/0119653 | A1 * | 4/2020 | Mariethoz | H02M 3/33584 |
| 2020/0220469 | A1 * | 7/2020 | Morrison | H02M 3/33553 |
| 2020/0266713 | A1 * | 8/2020 | Leibl | H02M 3/285 |
| 2020/0266719 | A1 * | 8/2020 | Oh | H02M 7/5387 |

* cited by examiner

DC/AC INVERTER RESONANCE TOPOLOGY

TECHNICAL FIELD

In at least one aspect, the present invention is related to electrical systems for automotive vehicles in which a low input DC voltage is converted into a high voltage AC output voltage. In particular, a DC/AC inverter is provided that can be used in electric or hybrid/electric automotive vehicles or any vehicle requiring a high AC or DC voltage.

BACKGROUND

Many modern automotive vehicles require high AC and DC voltage to operate the electronic devices and systems contained therein. Examples of inverters and/or converters are found in U.S. Pat. Nos. 10,023,072; 9,705,41; 9,537,401; 8,587,207; 7,514,817; 7,049,712; 6,807,072 and 6,205,035. Although the prior art designs work well, there is still a need for inverters with reduced size and improved efficiency.

SUMMARY

In at least one aspect, a DC/AC inverter system for powering or operating automotive vehicle components is provided. The DC/AC inverter system includes a primary DC-DC converter that receives an input DC voltage and a secondary DC/AC inverter. The primary DC-DC converter includes a plurality of switching networks and a plurality of transformers having a plurality of primary windings and a plurality of secondary windings. Characteristically, the plurality of secondary windings is arranged in series to provide a first output and a second output. A resonant LC circuit is connected in series with the first output and the second output. A rectifier rectifies an AC voltage between the first output and the second output to form a first rectified output. The secondary DC/AC inverter receives the first rectified output or filtered output thereof and provides a high voltage AC output. A controller mediates switching of the plurality of switching networks.

In another aspect, a DC/AC inverter system includes a primary DC-DC converter having a plurality of push-pull converters.

In another aspect, a DC/AC inverter system includes a primary DC-DC converter having a plurality of flyback converters.

In another aspect, a DC/AC inverter system includes a primary DC-DC converter having a plurality of H-bridge converters.

In another aspect, the DC/AC converter provides a high AC voltage (e.g., RMS voltage greater than or equal to 180 volts) that can be used to operate a vehicle system or device.

In another aspect, the DC/AC converter provides a high AC or DC voltage that can be used in an electric or hybrid/electric vehicle.

In another aspect, the DC/AC converter provided herein can operate without a fan while providing high conversion efficiencies (e.g., greater than 90%).

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time.

The terms "DC signal" refer to electrical signals that do not materially vary with time over a predefined time interval. In this regard, the signal is DC over the predefined interval. "DC signal" includes DC outputs from electrical devices and DC inputs to devices.

The terms "AC signal" refer to electrical signals that vary with time over the predefined time interval set forth above for the DC signal. In this regard, the signal is AC over the predefined interval. "AC signal" includes AC outputs from electrical devices and AC inputs to devices.

It should also be appreciated that any given signal that has a non-zero average value for voltage or current includes a DC signal (that may have been or is combined with an AC signal). Therefore, for such a signal, the term "DC" refers to the component not varying with time and the term "AC" refers to the time-varying component. Appropriate filtering can be used to recover the AC signal or the DC signal.

The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

The term "zero current switching" refers to transistor switching where the transistor turn-off transitions at zero current.

Throughout this application, where publications are referenced, the disclosures of these publications in their entireties are hereby incorporated by reference into this application to more fully describe the state of the art to which this invention pertains.

Abbreviations

"AC" means alternating current.
"DAC" means DC-to-AC converter.
"DC" means direct current.
"RMS" means root mean square.
"V" means volt.
"ZCS" means zero current switching.

Figure 1:
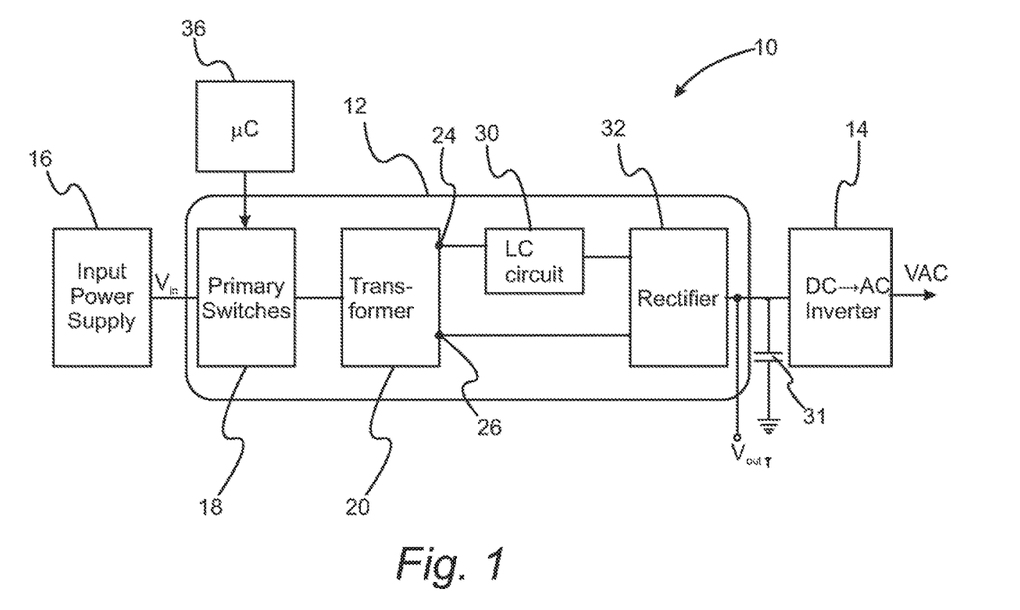
FIG. 1 provides a schematic of an AC/DC inverter system that provides a high DC and AC voltage for operating automotive electrical systems and devices.

In an embodiment, a DC/AC inverter system with a resonance topology is provided. Advantageously, the DC/AC inverter system can provide a 230V AC output at 400 watts from a 12V DC battery input which is useful for electric vehicle applications. FIG. 1 provides a schematic of the DC/AC inverter system. DC/AC inverter system 10 includes primary DC-DC converter 12 and a secondary DC/AC inverter 14. Primary DC-DC converter 12 receives an input DC voltage $V_{in}$ from input power supply 16 and outputs a high DC voltage $V_{out}$. In a refinement, the input DC voltage $V_{in}$ is from 5 to 20 volts. In a further refinement, the input DC voltage $V_{in}$, is from 11 to 16 volts. Primary DC-DC converter 12 includes a plurality of switching networks 18 that are switched to activate a plurality of step-up isolation transformers 20. Typically, the plurality of transformers 20 has a plurality of primary windings and a plurality of secondary windings. In a refinement, the output voltage of the transformers is about 120V. Each switching network includes one or more transistor switches. Moreover, each step-up isolation transformer has an associated switching network to activate its associated transformer. Characteristically, primary DC-DC converter 12 includes 2n transformers and 2n associated switching networks where n is an integer (e.g., n is 1, 2, 3, 4, 5, 6, etc.). In a refinement, primary DC-DC converter 12 includes 2 transformers and 2 associated switching networks. The secondary windings of the plurality of transformers 20 are connected in series with a first output 24 and a second output 26 from the in series secondary windings. In contrast, primary side of the transformers are configured with parallel switching networks operating associated primary windings of the transformers. Resonant LC circuit 30 is connected in series with first output 24 and second output 26. Typically, LC circuit 30 typically includes a capacitor and an inductor. In a refinement, a leakage inductance of the plurality of secondary windings functions as the inductor. Rectifier 32 rectifies the AC voltage between the first output and the second output to first rectified output. In a refinement, the first rectified output has an average voltage magnitude from about 80 to 400 volts. For example, rectifier 32 is in electrical communication with the AC voltage between first output 24 and second output 26 and provides an DC output $V_{out}$ therefrom. Secondary DC/AC inverter 14 receives the first rectified output or a filtered output thereof (e.g., smoothed by capacitor 31) and provides a high voltage AC output VAC. In a refinement, the high AC voltage output has an RMS voltage from about 80 to 250 volts. As set forth below in more detail, controller 36 mediates (e.g., controls) switching of the plurality of switching networks 18.

It should be appreciated that primary DC-DC converter 12 can include DC-DC converters of various designs. For example, primary DC-DC converter 12 can include 2n push-pull converters where n is an integer. In another example, primary DC-DC converter 12 can include 2n flyback converters where n is an integer. In still another example, primary DC-DC converter 12 can include 2n H-bridge converters where n is an integer.

Advantageously, DC/AC converter 10 can operate without a cooling fan while providing high conversion efficiencies that are greater than 90%.

Figure 2:
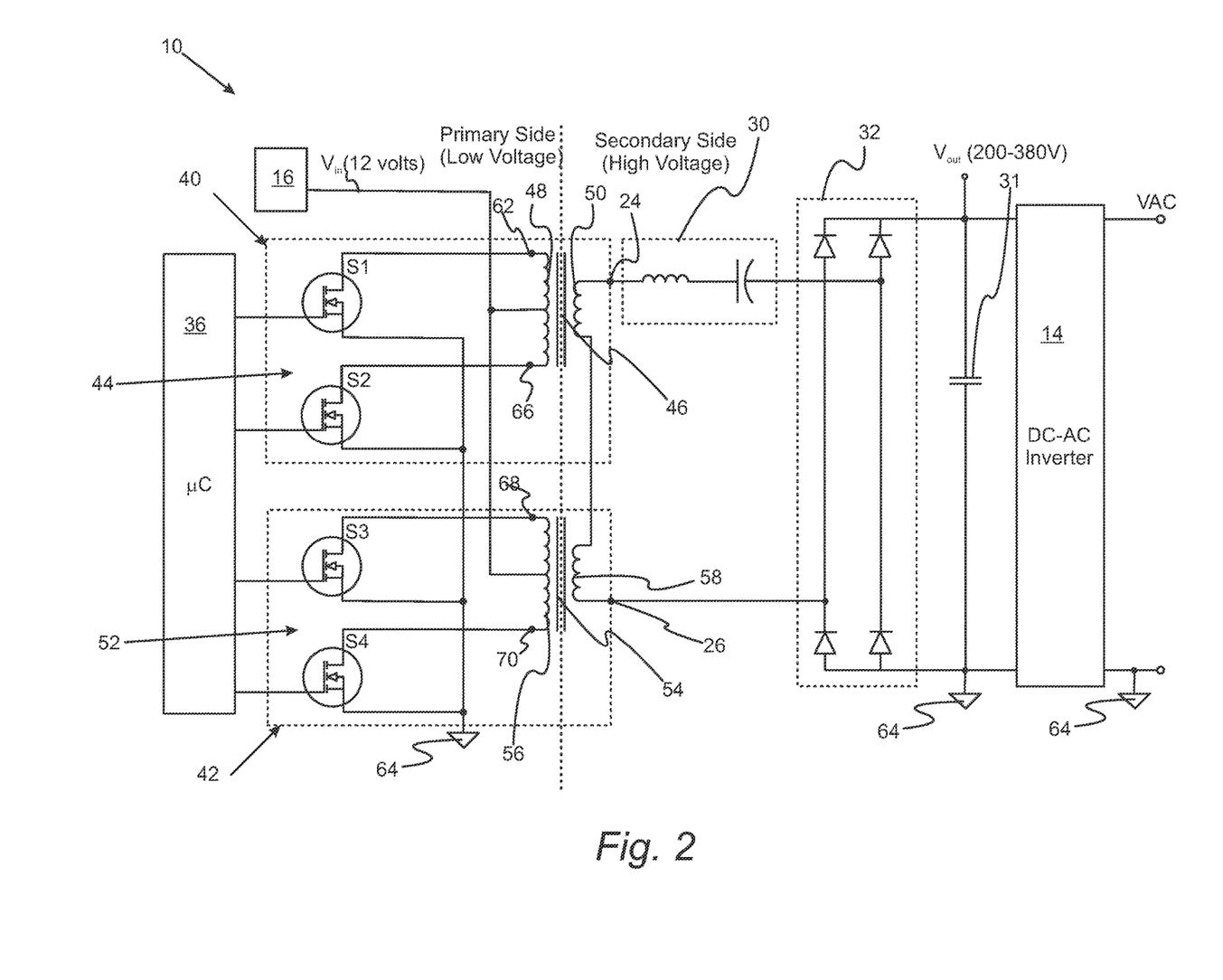
FIG. 2 provides a schematic of an AC/DC inverter system having two push-pull converters.

With reference to FIG. 2, a schematic illustration of a DC/AC inverter system that includes two push-pull converters with a resonance topology is provided. Characteristically, the primary sides are connected in parallel to minimize transformer size while secondary sides of the isolation transformers are connected in series through the resonant circuit. This design improves the efficiency of this configuration by minimizing isolation transformer losses. The primary, low-voltage sides of the isolation transformers are connected in parallel while the secondary windings are electrically connected in series. Advantageously, the low voltage side is isolated from the high voltage side at least partially by separation in the isolation transformers. DC/AC inverter system 10 includes first push-pull converter 40 and second push-pull converter 42. First push-pull converter 40 includes a first switching network 44 and a first isolation transformer 46. First isolation transformer 46 includes a first plurality of primary windings 48 and a first plurality of secondary windings 50. Second push-pull converter 42 includes second switching network 52 and a second isolation transformer 54. Second isolation transformer 54 includes a second plurality of primary windings 56 and a second plurality of secondary windings 58. In a refinement, the output voltage of the transformers is about 120V. The first switching network is configured to alternate an input DC voltage $V_{in}$ across the first plurality of primary windings 48. The input DC voltage Vin is typically provided by DC power supply 16. In a refinement, the input DC voltage is from 5 to 20 volts. In a further refinement, the input DC voltage is from 11 to 16 volts. Similarly, the second switching network is configured to alternate the input DC voltage across the second plurality of primary windings 56. Characteristically, the first plurality of secondary windings 50 and the second plurality of secondary windings 58 are connected in series to output a first output 24 and second output 26. Resonant LC circuit 30 (i.e., a resonant tank) is connected in series with first output 24. Resonant LC circuit 30 is connected in series with the first plurality of secondary windings 50 and the second plurality of secondary windings 56. In a refinement, the resonant LC circuit 30 includes a capacitor in series with an inductor. In a refinement, the leakage of the secondary windings is substantially used as the inductor. In yet a further refinement, the leakage inductance of the secondary windings is used as the inductor, and no separate or discrete inductor is provided as part of resonant circuit 30.

Still referring to FIG. 2, rectifier 32 receives the second output or a processed output thereof and outputs a first rectified output $V_{out}$. Characteristically, the first rectified output 50 includes a DC output or is filtered to provide a DC output. In a variation, rectifier 32 is a full bridge rectifier. In a refinement, the first rectified output has an average voltage magnitude from about 80 to 400 volts. In another refinement, the first rectified output is a high-voltage DC output ($V_{out}$) of approximately 200-380V.

In a variation, DC/AC inverter system 10 further includes a direct current to alternating current converter (DAC) 48 that receives the first rectified output or filtered output thereof and provides a stable AC output. In a refinement, the AC output has an RMS voltage from about 80 to 250 volts. Advantageously, a stable AC voltage output can be used to power AC loads designed for the 230V standard and about 400 watts.

Still referring to FIG. 2, controller 36 is applied to control switching of the first switching network and the second switching network. Typically, controller 36 is a microcontroller. In a refinement, first isolation transformer 46 and second isolation transformer 54 are each independently configured with a two-switch topology. In such a topology, first switching network 44 includes switches S1 and S2 while second switching network 52 includes S3 and S4. In particular, the gates of switches s1, s2, s3, and s4 are in electrical communication with the controller 46. The source and drain terminal of switch s1 is connected between a first terminal 62 of first isolation transformer 46 and a reference voltage 64 (e.g., a ground), the source and drain terminal of switch s2 is connected between a second terminal 66 of first isolation transformer 46 and reference voltage 64 (e.g., a ground). The source and drain terminal of switch s3 is connected between a first terminal 68 of second isolation transformer 54 and reference voltage 64 (e.g., a ground), the source and drain terminal of switch s4 is connected between a second terminal 70 of second isolation transformer 54 and a reference voltage 64 (e.g., a ground). Characteristically, the switches S1-S4 on the primary sides of the isolation transformers are implemented using power MOSFETs controlled by microcontroller 36. The primary transistors S1-S4 use a ZCS scheme to minimize switching losses. In a refinement, switches S1 and S3 are actuated (i.e., turned on) simultaneously and switches S2 and S4 are actuated simultaneously. Moreover, switches S1 and S3 are alternatingly actuated with respect to switches S2 and S4. In a refinement, the frequency with which each switch is actuated is from 40 kHz to 100 kHz. In another variation, the first isolation transformer 46 and the second isolation transformer 54 are each independently configured with a split primary winding as depicted in FIG. 2.

Figure 3:
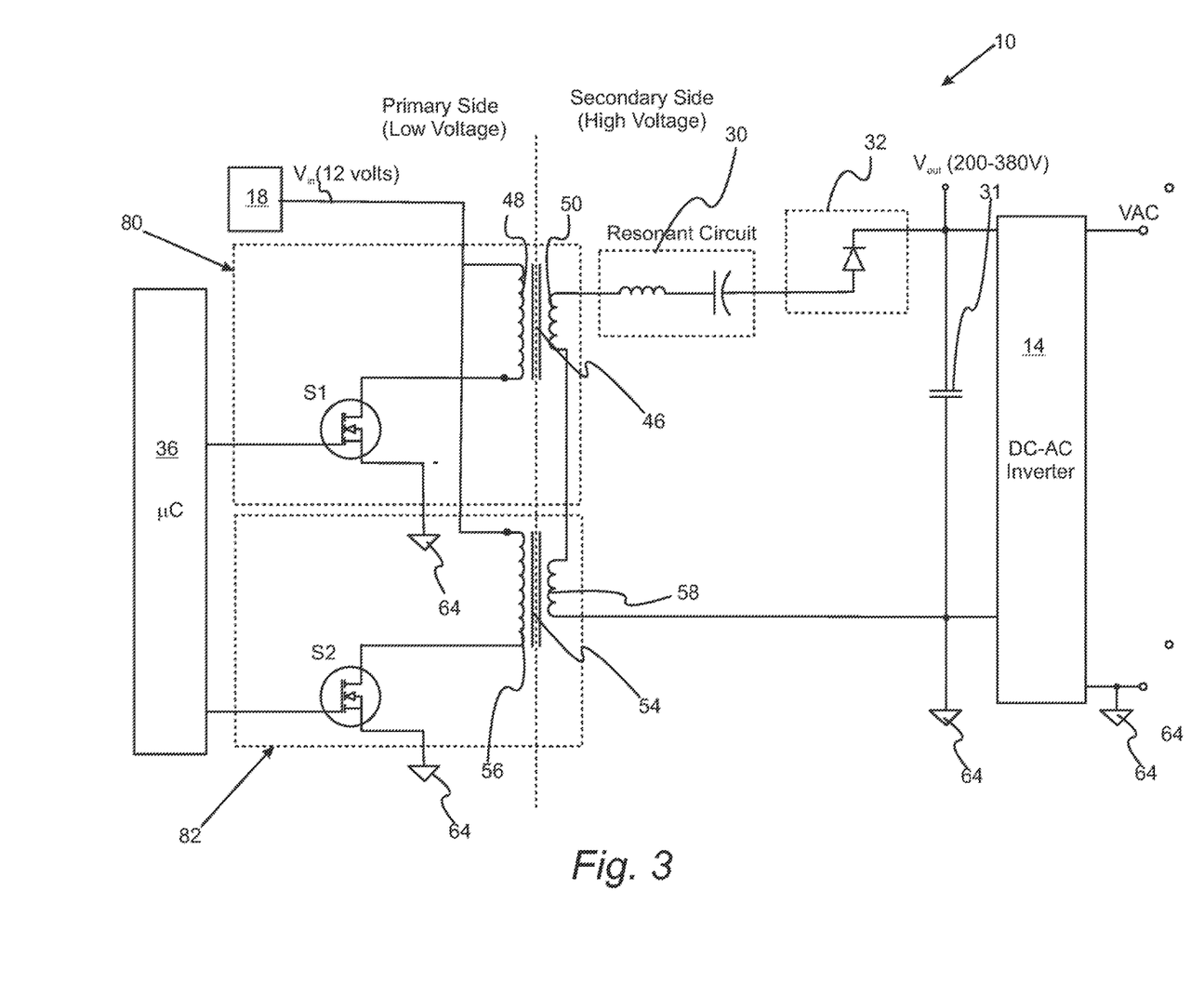
FIG. 3 provides a schematic of an AC/DC inverter system having two flyback converters.

With reference to FIG. 3, a schematic illustration of a DC/AC inverter system that includes two flyback converters with a resonance topology is provided. In this variation, DC/AC inverter system 10 includes first flyback converter 80 and second flyback converter 82. First flyback converter 80 includes transformer 46 which has one input to primary windings connected to input DC voltage and another input connected to transistor switch S1. Similarly, second flyback converter 82 includes second transformer 54 which has one input of primary windings 56 connected to input DC voltage and another input connected to transistor switch S2. The plurality of secondary windings 50 of first transformer 46 and the plurality of secondary windings 58 of second transformer 54 are connected in series as set forth above. In this variation, controller 36 controls the switching of switches S1 and S2. Moreover, in this variation, rectifier 32 is one-way signal diode. The details of the resonant LC circuit 30 and primary DC-DC converter 12 are the same as set forth above.

Figure 4:
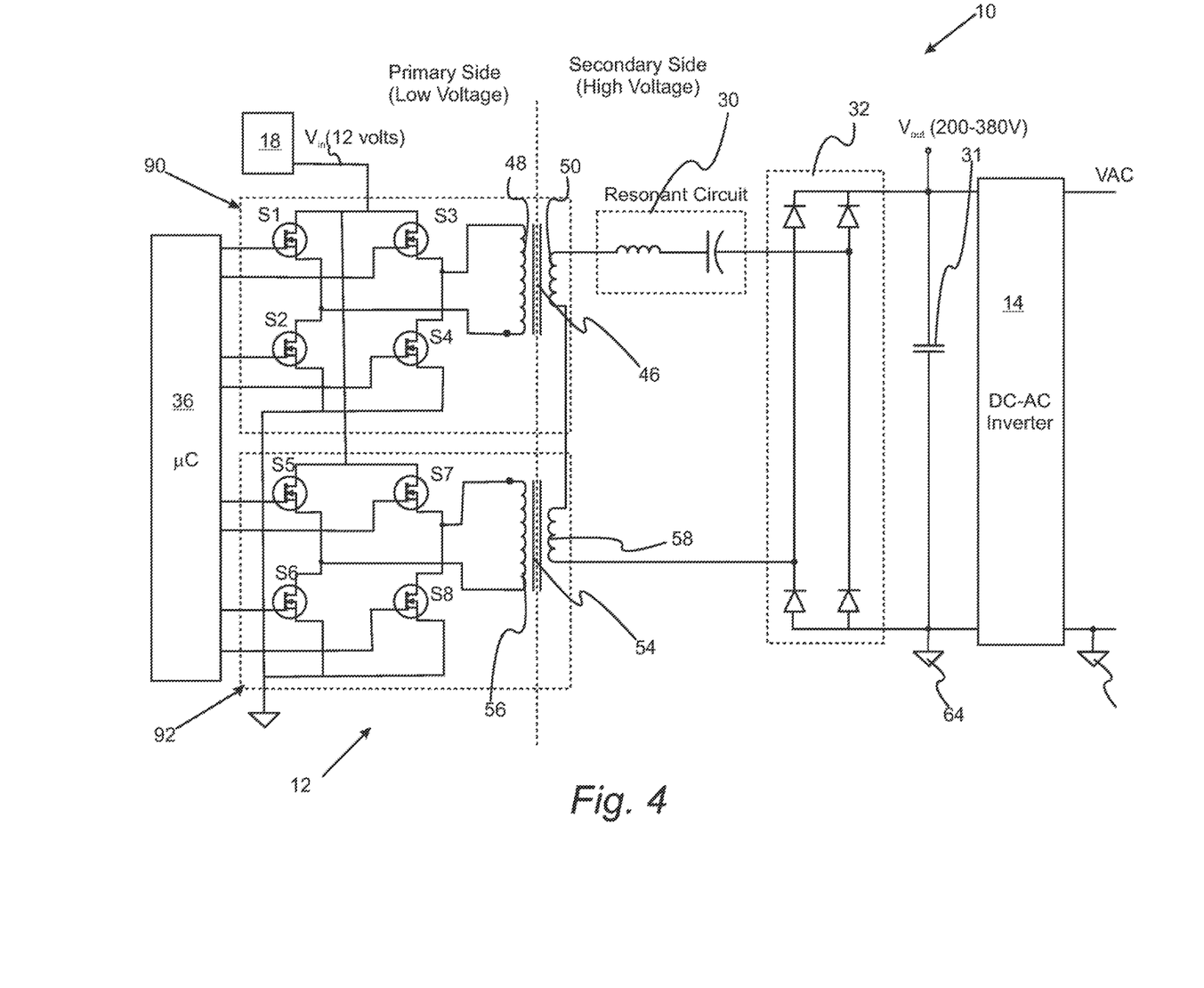
FIG. 4 provides a schematic of an AC/DC inverter system having two H-bridge converters.

With reference to FIG. 4, a schematic illustration of a DC/AC inverter system that includes two H-bridge converters with a resonance topology is provided. In this variation, DC/AC inverter system 10 includes first H-bridge converter 90 and second H-bridge converter 92. First H-bridge converter 90 includes transformer 46 and transistor switches S1, S2, S3, and S4 which are arranged in an H-bridge configuration. Transistor switches S1, S2, S3, and S4 are operated to alternate the direction of current flow through a first plurality of primary windings 48. Similarly, second H-bridge converter 92 includes second transformer 54 and transistor switches S5, S6, S7, and S8 which are arranged in an H-bridge configuration. Transistor switches S5, S6, S7, and S8 are operated to alternate the direction of current flow through a second plurality of windings 56. As set forth above, the plurality of secondary windings 50 of first transformer 46 and the plurality of secondary windings 58 of second transformer 54 are connected in series as set forth above. In this variation, controller 36 controls the switching of switches S1 and S8. The details of the resonant LC circuit 30, rectifier 32, and primary DC-DC converter 12 are the same as set forth above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A direct current/alternating current (DC/AC) inverter system comprising:
   a primary DC-DC converter that receives an input DC voltage and includes:
      a plurality of switching networks, wherein each switching network includes one or more transistor switches;
      a plurality of transformers having a plurality of primary windings and a plurality of secondary windings, each transformer having an associated primary winding of the plurality of primary windings and an associated secondary winding of the plurality of secondary windings, each transformer configured to be activated by switching of an associated switching network of the plurality of switching networks, each associated switching network of the plurality of switching networks configured to alternate the input DC voltage across the associated primary winding of the plurality of primary windings, wherein the plurality of secondary windings are arranged in series to provide a first output and a second output;
      a resonant LC circuit connected in series with the first output and the second output; and
      a rectifier that rectifies an AC voltage between the first output and the second output to form a first rectified output;
   a secondary DC/AC inverter that receives the first rectified output or filtered output thereof and provides an AC output; and
   a controller that controls switching of the plurality of switching networks, wherein the plurality of switching networks are switched with zero current switching at a frequency from 40 kHz to 100 kHz, the DC/AC inverter system being configured to operate without a cooling fan, wherein the resonant LC circuit includes a leakage inductance of the plurality of secondary windings in series with a capacitor.

2. The DC/AC inverter system of claim 1 wherein the primary DC-DC converter includes 2n push-pull converters where n is an integer equal to or greater than 2.

3. The DC/AC inverter system of claim 1 wherein the primary DC-DC converter includes 2n flyback converters where n is an integer equal to or greater than 2.

4. The DC/AC inverter system of claim 1 wherein the primary DC-DC converter includes 2n H-bridge converters where n is an integer equal to or greater than 2.

5. The DC/AC inverter system of claim 1 wherein the AC output has an RMS voltage from about 80 to 250 volts.

6. The DC/AC inverter system of claim 1 wherein the resonant LC circuit includes the capacitor in series with an inductor.

7. The DC/AC inverter system of claim 1 wherein the input DC voltage is from 11 to 16 volts.

8. The DC/AC inverter system of claim 1 wherein the first rectified output is a DC output or filtered output thereof.

9. The DC/AC inverter system of claim 1 wherein the first rectified output has an average voltage magnitude from about 80 to 400 volts.

10. A direct current/alternating current (DC/AC) inverter system comprising:
    a first push-pull converter including a first switching network and a first isolation transformer, the first isolation transformer includes a first plurality of primary windings and a first plurality of secondary windings, the first switching network configured to alternate an input DC voltage across the first plurality of primary windings;
    a second push-pull converter including a second switching network and a second isolation transformer, the second isolation transformer including a second plurality of primary windings and a second plurality of secondary windings, the second switching network also configured to alternate the input DC voltage across the second plurality of primary windings, the first plurality of secondary windings and the second plurality of secondary windings being connected in series to output a first output and a second output;
    a resonant LC circuit connected in series with the first output and the second output;
    a rectifier that rectifies an AC voltage between the first output and the second output to form a first rectified output;
    a controller that controls switching of the first switching network and the second switching network, wherein the first switching network and the second switching network are switched with zero current switching at a frequency from 40 kHz to 100 kHz, wherein the DC/AC inverter system is configured to operate without a cooling fan; and
    a DC/AC converter that receives the first rectified output or filtered output thereof and provides a high voltage AC output, wherein the resonant LC circuit includes a leakage inductance of the first plurality of secondary windings and the second plurality of secondary windings in series with a capacitor.

11. The DC/AC inverter system of claim 10 wherein the high voltage AC output has an RMS voltage from about 80 to 250 volts.

12. The DC/AC inverter system of claim 10 wherein the first isolation transformer and the second isolation transformer are each independently configured with a two-switch topology.

13. The DC/AC inverter system of claim 12 wherein the first isolation transformer and the second isolation transformer are each independently configured with a split primary winding.

14. The DC/AC inverter system of claim 12 wherein the first isolation transformer includes a first switch attached to a first terminal of the first isolation transformer and a second switch in electrical communication with a second terminal of the first isolation transformer.

15. The DC/AC inverter system of claim 10 wherein the resonant LC circuit is connected in series with the first plurality of secondary windings and the second plurality of secondary windings, the resonant LC circuit includes the capacitor in series with an inductor.

16. The DC/AC inverter system of claim 10 wherein the input DC voltage is from 11 to 16 volts and the first rectified output has an average voltage magnitude from about 80 to 400 volts.

\* \* \* \* \*